United States Patent [19]
Horst

[11] Patent Number: 5,742,135
[45] Date of Patent: Apr. 21, 1998

[54] SYSTEM FOR MAINTAINING POLARITY SYNCHRONIZATION DURING AMI DATA TRANSFER

[75] Inventor: Robert W. Horst, Saratoga, Calif.

[73] Assignee: Tandem Computers Incorporated, Cupertino, Calif.

[21] Appl. No.: 693,000

[22] Filed: Jun. 28, 1996

[51] Int. Cl.⁶ .................................................. H04L 7/00
[52] U.S. Cl. .................................... 375/354; 375/242
[58] Field of Search ............................ 375/354, 359, 375/364, 293, 342, 242; 360/40

[56] References Cited

U.S. PATENT DOCUMENTS

| | | | |
|---|---|---|---|
| 4,071,692 | 1/1978 | Weir et al. | 375/359 |
| 4,267,595 | 5/1981 | Hernandz | 375/342 |

*Primary Examiner*—Temesghen Ghebretinsae
*Attorney, Agent, or Firm*—Townsend and Townsend and Crew LLP

[57] ABSTRACT

A communication system transmitting AMI encoded data forces a latent error to occur within a predetermined time duration from an event which generated the latent error. Bit values of original data are selectively inverted to prevent a long sequence of zeros from being transmitted.

4 Claims, 5 Drawing Sheets

SYSTEM FOR MAINTAINING POLARITY SYNCHRONIZATION DURING AMI DATA TRANSFER

BACKGROUND OF THE INVENTION

1. Field of the Invention

The present invention relates generally to data transfer systems and more particularly to a coding/decoding system for use in a computer network.

2. Description of the Relevant Art

Various modes of encoding digital data are well-known in the art. One particular type of coding is Alternate Mark Inversion (AMI) encoding, which is a specific type of Pulse Code Modulation (PCM) where a bit value of input data is transmitted each clock cycle and where successive bit values of one are encoded as pulses of alternating polarity and bit values of zero are encoded as the lack of a pulse for a clock period.

Because of the alternating polarity of the pulses AMI encoding facilitates AC transformer-coupling to the pins of a receiver to eliminate common mode noise due to power and ground potential differences between the transmitter system and the receiver system.

One problem of a receiver design that requires alternate polarity pulses associated with AMI coding is loss of polarity synchronization between a transmitter and receiver when the input data includes a long sequence of zeros. Typically, the receiver encodes a one when it detects a change in pulse polarity. However, during power-up or in the presence of a dropped or added bit during a long string of zeros, the receiver transitions to expecting a pulse of different polarity than the pulse to be next transmitted.

Loss of polarity synchronization may occur when an error in encoding a bit occurs. In that case at least one more error will occur before polarity synchronization is recovered. The second error, dropping a bit, will not occur until another pulse is transmitted and thus if a long sequence of zeros is transmitted the second error will remain latent during the time that the zeros are being transmitted. If data is transmitted in packets separated by sequences of zeros then a first error occurring in a first packet would result in a second error occurring in a second packet transmitted much later.

SUMMARY OF THE INVENTION

The present invention is a system for maintaining AMI pulse polarity-synchronization between a transmitter and receiver during a period between pulses and for recovering from a dropped or added bit in a predetermined number of clock cycles.

According to one aspect of the invention, bit values in original input data to be AMI encoded are selectively inverted prior to encoding and selectively inverted transmitted bit values are selectively uninverted subsequent to AMI decoding so that a long sequence of zeros will not be transmitted. The same bit values inverted prior to encoding are uninverted subsequent to decoding to recover bit values equal to the bit values of the original data. The selective inversion and uninversion force a quick recovery of polarity synchronization even if a long sequence of zeros is being transmitted.

According to another aspect of the invention, an AMI encoder includes a set of Send Bit Logic units, each for encoding one bit value in a multi-bit input word. Each Send Bit Logic unit encodes successive ones by generating pulses of opposite polarity to AMI encode a sequence of transmit bit values. The Send Bit Logic units invert an incoming input bit value prior to AMI encoding if a SendInvert signal is asserted.

Similarly, an AMI decoder receives the multi-bit transmitted words encoded as AMI signals and includes a set of Receive Bit Logic units for decoding received pulses to generate a sequence of decoded RCV bit values. The Receive Bit Logic units invert a decoded RCV bit value if a RcvInvert signal is asserted to recover the original input bit values.

State machines at the AMI encoder and decoder invert bit values of original input data prior to encoding and uninvert corresponding decoded bit values subsequent to decoding so that the uninverted bit values are identical to the bit values in the original data.

According to another aspect of the invention, a state machine synchronizing circuit responds to a predetermined sequence of received multi-bit words to force the state machine at the AMI decoder to a state that uninverts the bits inverted by the AMI encoder.

Other features and advantages of the invention will become apparent in view of the following detailed description and appended drawings.

DETAILED DESCRIPTION OF THE PREFERRED EMBODIMENTS

Figure 1A:
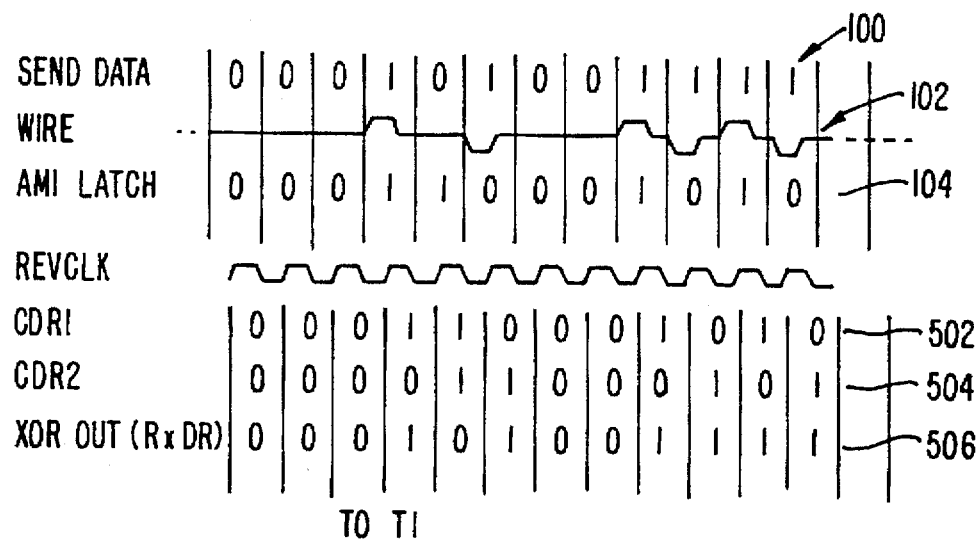
FIG. 1A is a timing diagram depicting the details of AMI encoding, transmission, and decoding.
Figure 1B:
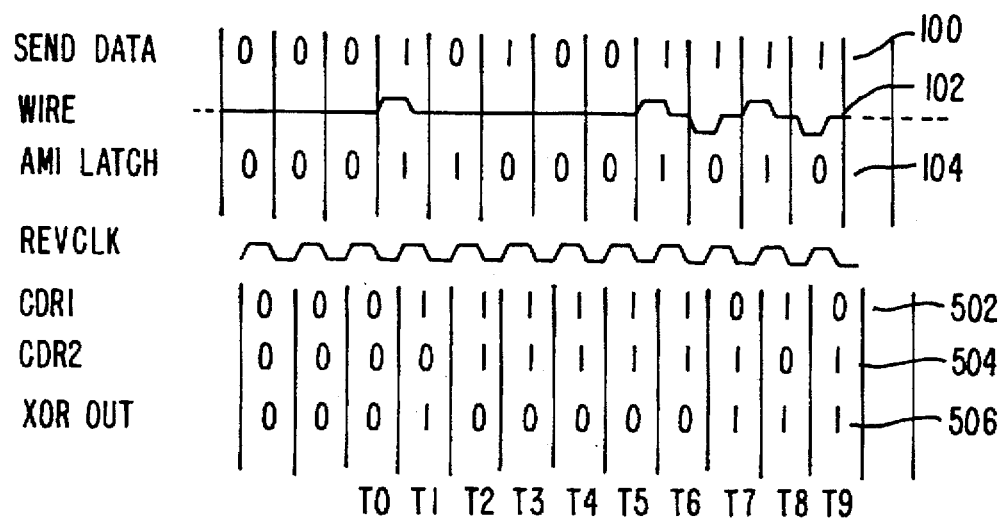
FIG. 1B is a timing diagram illustrating the occurrence of first and second errors due to loss of polarity synchronization.

FIG. 1 depicts exemplary input data bit values 100, AMI-encoded pulses 102, and receiver-latch data sequence 104. A low-voltage, differential signal (LVDS) driver and receiver latch 200 and 202 with the receiver-latch 202 AC-coupled to the driver by a twisted pair cable 204 is depicted in FIG. 2.

Figure 2:
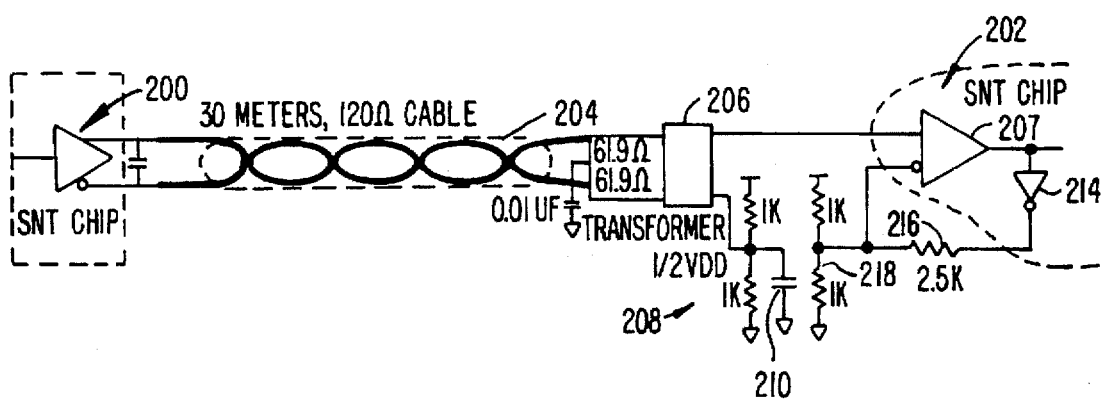
FIG. 2 is a schematic diagram depicting AC transformer coupling of a driver and receiver-latch.

Referring to FIGS. 1 and 2, the driver 200 generates a 3-state LVDS (Vref, Vref+(300–400 mV), Vref"(300–400 mV) for the purpose of external AC coupling. The input of the driver is coupled to receive a data signal and the non-inverting and inverting outputs are coupled to the first end of a 120 Ohm, 30 meters long, twisted shielded pair (STP) cable 204.

The second end of the STP cable 204 is connected to the inputs of a transformer 206, having first and second output terminals. A first output terminal is coupled to the non-inverting input of a receiver-latch op-amp 207 and the second terminal is coupled to a node of a first voltage divider 208 formed by first and second 1K resistors, and is also coupled to ground through a coupling capacitor 210. The output of the receiver op-amp 207 provides a received data signal and is coupled to the non-inverting input of the op-amp 207 by an invertor 214 and 2.5K feedback resistor 216. The non-inverting input is also coupled to the node of a second voltage divider 218 formed of first and second 1K resistors.

Figure 3:
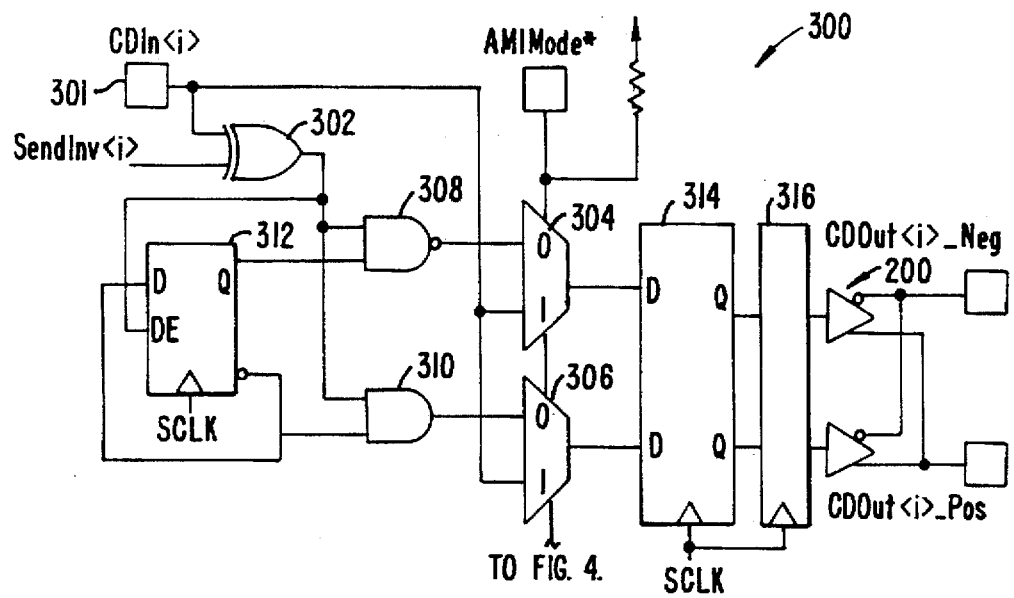
FIGS. 3 and 4 are schematic diagrams of the receive and send bit logic units.
Figure 4:
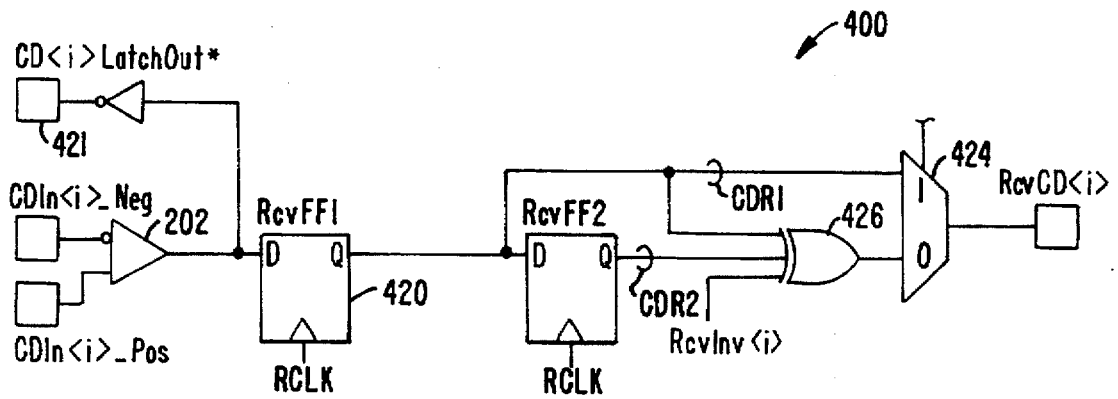

FIGS. 3 and 4 are schematic diagrams of the Send Bit Logic 300 and Receive Bit Logic 400, respectively. In FIG. 3, each bit value of the original input data is received at the CDin terminal 301, which is coupled to the upper input of a SEND XOR gate 302 and the lower inputs of first and second SEND muxes 304 and 306. The lower input of the SEND XOR gate 302 receives a SendInv signal and the output of the SEND XOR gate 302 is coupled to the upper inputs of NAND gate 308, AND gate 310 and to the data enable (DE) input of a clocking flip-flop 312. The Q output of clocking flip-flop 312 is coupled to the lower input of NAND gate 308 and the inverted Q output of the clocking flip-flop 312 is coupled to the lower input of AND gate 310 and to the data (D) input of the clocking flip-flop 312. The output of the NAND gate 308 is coupled to the upper input of the first send MUX 304 and the output of the AND gate 310 is coupled to the upper input of the second SEND mux 306. The output of first and second SEND Muxes 304 and 306 are coupled to the upper and lower D inputs of SEND latch 314 and the Q outputs of the SEND latch 314 are coupled to the driver circuit 200 to generate the LVDS transmitted signal (CDOut_Neg, CDOut_Pos) through a pulse chopper logic block 316. The pulse chopper logic block 316 can generate either full or half-period LVDS pulses. The clock inputs of the clocking flip-flop 312 and the SEND latch 314 are coupled to receive the SEND CLOCK (SCLK) signal.

In FIG. 4, the LVDS received signal (CDIn_Neg, CDIn_Pos) is received by differential inputs of the receiver-latch 202. The output of the receiver-latch is coupled to the D input of a first receive flip-flop 420 (RcvFF1) and to a CDLatchOut terminal 421 via an invertor. The Q output of RcvFF1 420 is coupled to the D input of a second receive flip-flop 422 (RcvFF2), the upper input of a RCV mux 424, and the upper input of a first RCV XOR gate 426. The Q output of RcvFF2 422 is coupled to a middle input of the RCV XOR gate 426 and the bottom input of the RCV XOR gate 426 is coupled to receive a SendInv signal. The clock inputs of RcvFF1 420 and RcvFF2 422 are coupled to receive the RCV CLOCK (RCLK) signal.

The control inputs of the first and second SEND muxes 304 and 306 and RCV mux 424 are coupled to an AMIMode terminal which receives a signal to select between the NRZ (non-return to zero) or AMI data encoding. The operation of the Send Bit Logic when SendInv is high and AMI encoding is selected will now be described.

The feedback between the inverted Q output and the D input of the clocking flip-flop 312 and interconnection of the Q and inverted Q outputs to the NAND and gates 304 and 306 cause pulses of alternating polarity to be generated at the SCLK rate when the DE input is enabled and no pulses to be generated when the DE input is not enabled. Thus, for original input data bit values 200, as depicted in FIG. 1, the AMI encoded signal 104 will be generated by the Send Bit Logic.

Referring back to FIG. 1, a table is depicted illustrating the operation of the Receive Bit Logic when the RcvInv signal is one. The output of the receiver-latch for a signal received at time T1 is held in RcvFF1 420 and output as the CDR1 signal 502. The receiver-latch 202 is designed so that its output changes only when a pulse received at clock cycle T1 is of opposite polarity than a previously received pulse received during a previous clock cycle, in this example T0. The output, CDR2 504, of the RcvFF2 422 is the signal output by the receiver-latch 202 at time T0, which is the clock cycle immediately preceding T1. The output of the first RCV XOR gate 426, which is the received bit, is therefore 1 only when CDR1 and CDR2 have different values.

If the pulses received at the receiver-latch 202 do not alternate in polarity when successive bit values of one are to be transmitted then the output of the RCV XOR gate 426 will be incorrect, dropping a bit. Errors are always paired, i.e., if an error occurs another error will occur before the Send Bit Logic and Receive Bit Logic units are again polarity-synchronized. For example, in FIG. 1B, assume that an error occurred at T3 which causes the AMI to latch a erroneously not change state and continue to latch a one, dropping a bit, during the transmission of a sequence of zeros from T2 to T5. Thus, the first error is outputting a zero when a one was transmitted. Note that an error at XOR out 506 occurs at T3. Upon subsequent transmission of a bit value of one at T6 the bit value of XOR out is zero because the AMI latch was expecting a pulse of negative polarity. Thus, the second error, dropping a bit, occurs at T6. Subsequent to T6 the Send Bit Logic and Receive Bit Logic Units are again polarity synchronized because the Send Bit Logic will transmit a negative pulse to encode a one and the receiver-latch 200 will change its output when a negative pulse is received. Note that the re-synchronization cannot occur until after the pulse at T6 is received. Thus, if a string of zeros is transmitted after the first error occurs there will be an indeterminate delay before the second error. If data is transmitted in packets with zeros transmitted between packets, the first error could occur in one packet and the second error in another packet transmitted much later. Accordingly, the second error remains latent until another pulse is transmitted. Such latency is undesirable and more efficient error handling can be implemented if both errors are localized in time.

There are at least two problematic scenarios, the first being at power-up when a sequence of zeros may be generated prior to any data being sent. The Send Bit Logic and Receive Bit Logic units 300 and 400 may not be polarity-synchronized, so that at the first non-zero bit value of real data sent would be lost. Secondly, during the transmission of a long sequence of zeros a transient fault could cause the receiver-latch to be set to the wrong state.

Figure 5:
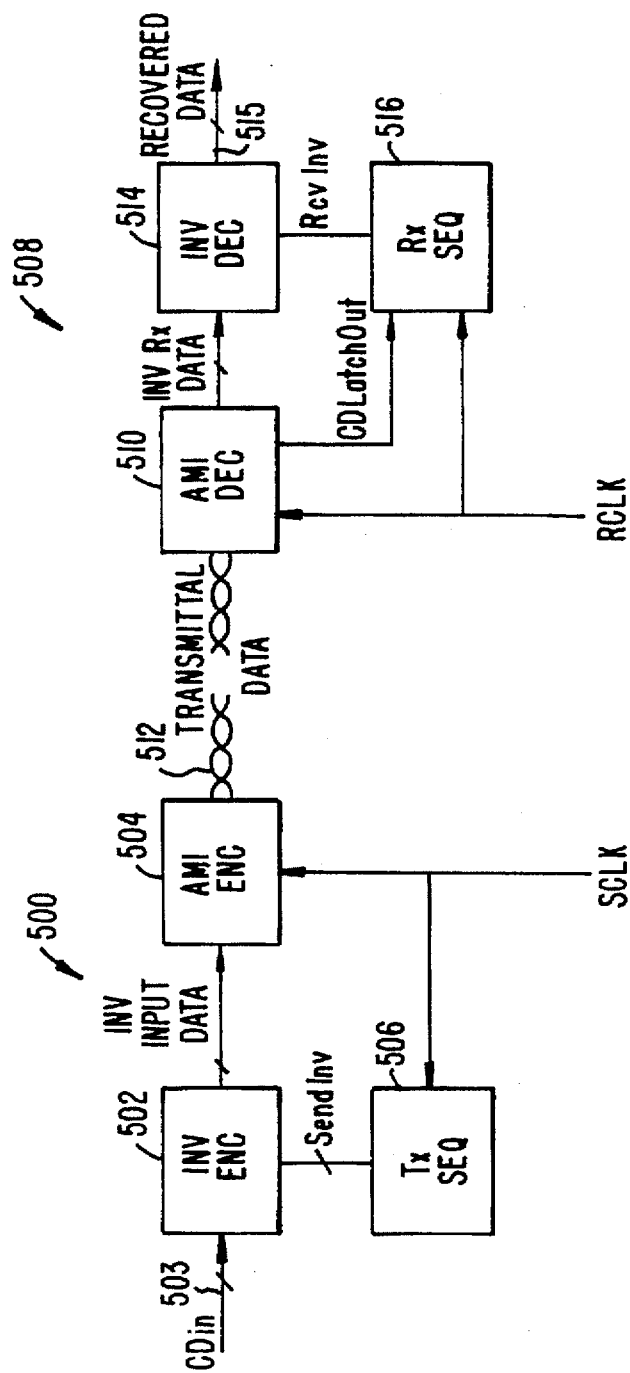
FIG. 5 is a block diagram of a preferred embodiment of the invention.

FIG. 5 is a block diagram of the present invention. In FIG. 5, on the transmit side 500 an Inversion encoder 502 has an data input port coupled to receive original multi-bit data words (CDin) provided by a CDin BUS 503, a data output port coupled to the data input port of an AMI Encoder 504, and a control input port coupled to receive a multi-bit SendInv signal output by a Tx Sequencer 506. Both the AMI Encoder and Tx Sequencer have clock inputs coupled to receive SCLK.

On the receive side, 508 a data output of the AMI Encoder 504 is coupled to the data input of an AMI Decoder 510 by a twisted pair cable 512. The data output port of the AMI decoder 510 is coupled to the data input port of an Inversion Decoder 514 and a CDLatchOut output port is coupled to the input port of an Rx Sequencer 516. The RcvInv output port of the Rx Sequencer 516 is coupled to a control input port of the Inversion Decoder 514 and the output port of the Inversion Decoder 514 provides recovered bit values (RcvCD), equal to the bit values of the original input data, on a RcvCD BUS 515.

The INV encoder 502 and AMI encoder 504 receives multi-bit input data words on the multi-bit CDin bus 503 and include a Send Bit Logic unit 300 coupled to each bit line of the CDin bus 503. An AMI decoder 510 and INV decoder 514 similarly includes a Receive Bit Logic unit 400 for providing a multi-bit RcvCD word, comprising the recovered bit values of the input data, to each bit line the RcvCD bus 515. Thus, as original input data words are provided at each SEND clock cycle, each Send Bit Logic unit 300 receives and encodes an input sequence of bit values, and as transmitted data words are received by each RCV clock cycle, each Receive Bit Logic unit 400 generates a sequence of recovered data bit values.

The transmit sequencer 506 (TXSEQ) receives the SCLK signal and provides a set of SendInv signals to the Send Bit Logic units 300 in the INV decoder 502 and AMI encoder 504. The receive sequencer 516 (RcvSEQ) receives the RCLK signal, the CDlatch signals from the Receive Bit Logic units 300 in the AMI decoder 510, and generates a set of RcvInv signals to be provided to the INV decoder 514. In the preferred embodiment the RCV XOR gate 426 in the Receive Bit Logic units 400 functions as the INV decoder 514.

The TXSEQ 506 includes a SEND state machine that asserts specified SendInv signals to invert particular CDin bits to be transmitted and the RcvSEQ 516 includes a RCV state machine that asserts specified RcvInvert signals to uninvert particular received RxDr signals. As will be described below, the SEND and RCV state machines are synchronized so that each CDin bit inverted prior to sending is uninverted upon reception, so that the operation of the state machines does not affect the bit values of the original input data being transmitted.

However, because the bits are periodically inverted, no long sequence of zeros will be transmitted and a long sequence of ones would contain at most two consecutive zeros so that the Send Bit Logic and Receive Bit Logic will remain polarity-synchronized when the bit values of the data to be transmitted includes of a long sequence zeros.

Figure 6:
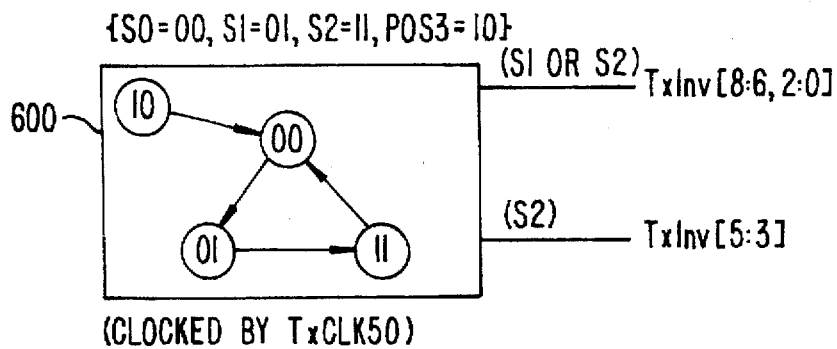
FIG. 6 is a schematic diagram of the send state machine.
Figure 7:
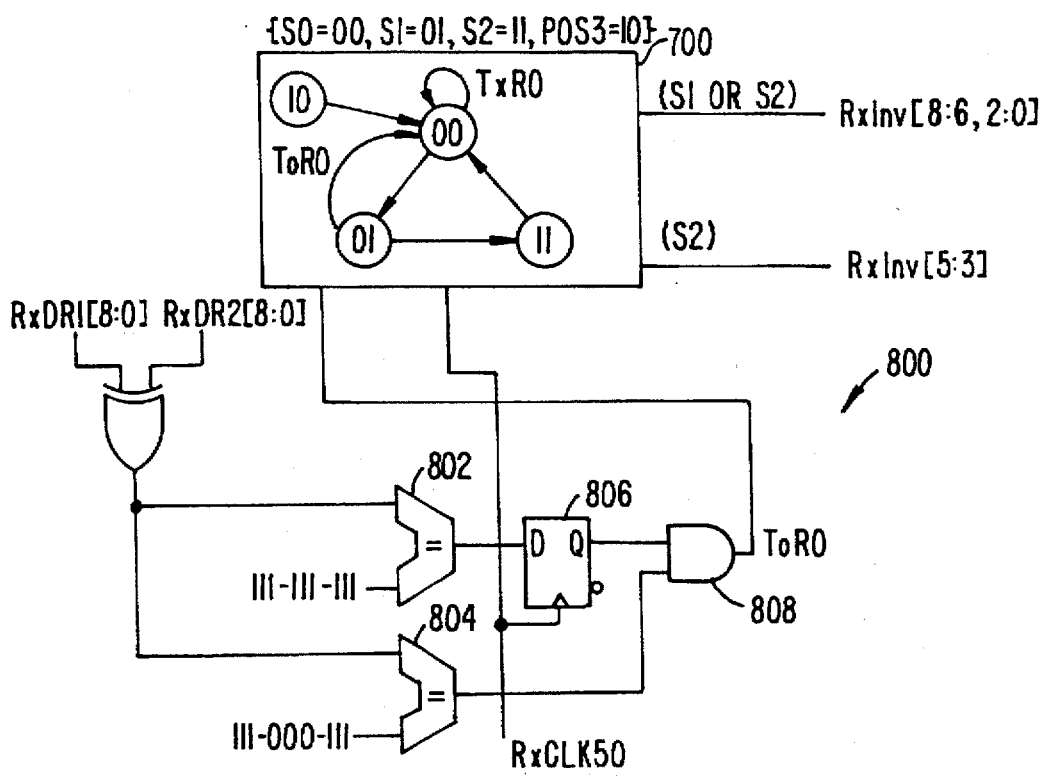
FIG. 7 is a schematic diagram of a send diagram.

FIGS. 6 and 7 depict the SEND and RCV state machines 600 and 700 respectively. The particular embodiments of the state machines described are designed to be utilized in a ServerNet system designed by Tandem Computers Incorporated of Cupertino, Calif. In that system nine-bit words are transmitted between processors. Thus, each AMI encoder and decoder in the system has separate Transmit Bit Logic units 300 and Receive Bit Logic units for each of the nine bits to be processed. In an alternative embodiment, the clocking flip-flop 312 could be common to all the Send Bit Logic units 300.

When no data is being transmitted an IDLE signal is transmitted each clock cycle, the ServerNet IDLE code has the following format:

000 111 000

In the ServerNet system there are no forced transitions on power-up and the IDLE code has six bits that can stay at zero for long periods. Thus, as described above, there is a chance that the first real word of data sent would get an error because on the receiver-latch was expecting a different polarity than the sender.

Referring now to FIG. 6, the SEND state machine 600 is free running and sequentially transitions between the states S0, S1, and S2 every clock cycle. During S0 no bits are inverted, during S1 SendInv signals are generated for HighLow bits [8:61] and [2:0], and during S2 SendInv signals are generated for all nine bits [8:0]. During IDLE the following codes are generated and transmitted by the SEND unit:

ACTUAL CDin DATA→DATA OUTPUT FROM AMI ENCODER 000 111 000→000 111 000 (State S0:Invert None)

000 111 000→111 111 111 (State S1:Invert HighLow)

000 111 000→111 000 111 (State S2:Invert All)

Similarly, the RCV state machine 700 transitions between the states R0, R1, and R2 every clock cycle. During R0 no bits are inverted, during R1 RcvInv signals are generated for HighLow bits [8:6] and [2:0], and during R2 RcvInv signals are generated for all nine bits [0:8]. During IDLE the following codes are received and decoded by the SEND unit:

CDrx DATA RECEIVED AT AMI DECODER→ACTUAL RcvCD DATA 000 111 000→000 111 000 (State R0:Invert None)

111 111 111→000 111 000 (State R1:Invert HighLow)

111 000 111→000 111 000 (State R2:Invert All)

Accordingly, if the SEND and RCV state machines are synchronized so that R0 uninverts the bits inverted by S0, R1 uninverts the bits inverted by S1, and R2 uninverts the bits inverted by S2, then the recovered bit values are not affected by the bit inversions caused by the SEND and RCV state machines 600 and 700. However, as is apparent from the above description, for a long string of zeros in the original input data there is only one clock cycle between the alternating pulses which encode ones. Therefore, the SEND and RCV units will maintain polarity synchronization when a first error occurs before a long string of zero bit values to be transmitted occurs in the original input data, as is the case when a long string of IDLE signals are to be transmitted, by inverting at least one of zero bit values so that a pulse is transmitted to cause re-synchronization of polarity and to prevent loss of the next bit of real data.

The system for synchronizing the SEND and RCV state machines 600 and 700 will now be described. The RCV state machine is forced to R0 if the signal ToR0 is generated. A ToR0 circuit 800 for generating the signal ToR0 receives the 9-bit word transmitted by the AMI encoder (the CDLatchOut signal of FIG. 4). This received signal is provided to first and second comparators 802 and 804. The first comparator 802 compares the received signal to "111-111-111" and the second comparator 804 compares the received signal to "111-000-111". The output of the first comparator 802 is coupled to the data (D) input of a flip-flop 806 and the output of the second comparator 804 is coupled to the lower input of AND gate 808. The inverted (Q) output of the flip-flop 806 is coupled to the upper input of AND gate 808. The output of the AND gate 808 is the ToR0 signal which is coupled to the RCV state machine 700. Both the RCV state machine 700 and ToR0 generating circuit 800 are clocked by RCLK.

If the AMI decoder receives a "111-111-111" (first predetermined code (FPC)) followed by "111-000-111" (second predetermined code (SPC)), then the ToR0 signal is asserted by the ToR0 generating circuit 800. The design of the ToR0 generating circuit depends on the fact that in ServerNet the code "000-000-000" is illegal. The receipt of the FPC followed by the SPC during a sequence of IDLEs implies that the SEND state machine has just transitioned through S1 and S2 and is about to transition to S0. Thus, the RCV state machine is forced to R0 and the two state machines are synchronized. By a process of elimination, if the RCV state machine had been in state S0 when the FPC was received then in the next clock the SPC would have been generated by S1. However, the actual data would have to be "000-000-000" if the SPC were to be generated by S1 (Invert HighLow) but this is illegal, so the sequence of FPC and SPC could not have started with S0. Similarly, if the RCV state machine had been in state S2 when the FPC was generated then the actual data would be "000-000-000" (Invert All), but this is illegal to the sequence of FPC and SPC could not have started with S2. Accordingly, the FPC and SPC must have been generated when the SEND state machine sequenced through states S1 and S2.

The invention has now been described with reference to the preferred embodiments. Alterations and substitutions will be apparent to persons of skill in the art. In particular, the operation of state machines has been described with reference to the ServerNet IDLE signals. Systems generating frequently occurring words with zeros in different bit positions than the IDLE signals described above can utilize the invention by changing the bit positions of bit values inverted by the SendInvert and RcvInvert signals. Further, the system for synchronizing can be modified to depend on the presences of an illegal code different than described above. By changing which bit positions are inverted in S1 and S2 and the FPC and SPC symbols, the same scheme can be used for any input data that has at least one illegal symbol (in the above-described embodiment 000-000-000) and another symbol that appears frequently enough to re-synchronize polarity after errors or power on (in the above-described embodiment the IDLE signal 000-111-000). Accordingly, it is not intended to limit the invention except as provided by the appended claims.

What is claimed is:

1. A communication system for transmitting AMI encoded data, where successive one bit values of original input data are AMI encoded as pulses of opposite polarity and where zero bit values are AMI encoded by the lack of a pulse, with the communication system forcing a latent error due to lack of polarity synchronization to occur within a predetermined time duration from an event which generated the latent error, said system comprising:

an inverting unit, coupled to receive a sequence of original input data bit values at a clock rate, for periodically inverting spaced apart bit values in the sequence of original input data bit values to generate inverted bit values separated in time by no more than the predetermined time duration, with the inverting unit providing an output sequence of inverted bit values including at least one original bit value;

an AMI encoder, coupled to said inverting unit to receive said output sequence and to a communication channel, for AMI encoding and transmitting a transmitted sequence of bit values including the original bit values and inverted bit values in said output sequence;

an AMI decoder, coupled to the communication channel to receive and decode the transmitted sequence of original and inverted bit values; and an uninverting unit, coupled to the AMI decoder, for inverting only the inverted bit values in the decoded transmitted sequence of original and inverted bit values to recover the sequence of original bit values.

2. The system of claim 1 where:

said inverting unit includes a transmit state machine for generating transmit invert signals to invert bit values in the sequence of original input data bit values;

said uninverting unit includes:

a receive state machine for generating receive invert signals to invert bit values in the decoded transmit sequence of bit values;

a synchronization unit for synchronizing the transmit and receive state machines so the bit values inverted in response to the transmit invert signals are inverted again in response to the receive invert signals so that the original input data is recovered.

3. The system of claim 2 where the communication system transmits multi-bit words, having a plurality of bit positions, in parallel, with the system having a specific word which is frequently transmitted, wherein:

said transmit and receive state machines each cycle through a sequence of corresponding states that invert the same bit positions in multi-bit words, with the frequently transmitted word converted into first and second predetermined codes by first and second states of the transmit state machine;

with said synchronizing unit including a circuit for detecting when said first and second predetermined codes are received and forcing the receive state machine into a state corresponding to the state of the send state machine following the first and second states upon receipt of the first and second predetermined codes.

4. A communication system comprising:

an AMI encoder for encoding multi-bit input words, the AMI encoder having a clock input for receiving an SCLK signal that defines a sequence of SEND clock cycles and including a plurality of bit encoding units, each bit encoding unit for receiving a bit in an input data word so that the bit encoding unit receives a SEND bit sequence of input bit values comprising a sequence of one and zero bit values, each bit value received during a SEND clock cycle, and with each bit encoding unit having a control input for receiving a SendInvert signal, with each bit encoding unit in the AMI encoder for encoding said SEND bit sequence by generating pulses of alternating polarity during SEND clock cycles when a bit value of one included in said input data and for generating no pulse during SEND clock cycles when a bit value of zero is included in said input data and with each bit encoding unit in said AMI encoder for inverting bit values in said input data prior to encoding if said SendInvert signal is asserted;

a SEND state machine, coupled to receive said SCLK signal and for providing said SendInvert signal to each bit encoding unit, said SEND state machine for transitioning between a sequence of SEND states during SEND clock cycles and for asserting specified SendInvert signals during each SEND state to invert bit values in specified bit positions of an input multi-bit word;

an AMI decoder, coupled to receive transmitted multi-bit words encoded by said AMI encoder, for decoding transmitted multi-bit words, the AMI decoder having a clock input for receiving a RCLK signal that defines a sequence of RCV clock cycles and including a plurality of bit decoding units, each bit decoding unit for receiving a bit in a transmitted multi-bit data word so that the bit decoding unit receives pulses of first or second polarity or no pulses during each RCV clock cycle and provides a decoded output sequence of bit values, and each bit decoding unit coupled to a bit inversion unit having a control input for receiving RcvInvert signal, and with each bit decoding unit in the AMI decoder for latching a latched bit value in response to receiving a pulse of a first polarity and for changing the value of said latched bit value only when a pulse of a second polarity is received and with the bit decoding unit for outputting a bit value equal to one during RCV clock cycles when the latched value changes and a bit value equal zero during RCV clock cycles when the output does not change, and with each bit inversion unit for inverting said decoded RCV bit value when the RcvInvert signal is inverted;

a RCV state machine, coupled to receive said RCLK signal and for providing said RcvInvert signal to each bit decoding unit, for transitioning between a sequence of RCV states corresponding to the SEND states during RCV clock cycles and for asserting specified RcvInvert signals during each RCV state to invert decoded bit values output by specified bit decoding units; and a state machine synchronizing unit, coupled to receive the transmitted bit values received by the AMI decoding unit, for forcing said RCV state machine to a specified state when a predetermined sequence of transmitted multi-bit words is received so that input bit values inverted in response to SendInvert signals asserted during a SEND state are inverted in response to RcvInvert signals asserted during a corresponding RCV state.

* * * * *